(12) United States Patent
Malone et al.

(10) Patent No.: US 9,473,706 B2
(45) Date of Patent: Oct. 18, 2016

(54) IMAGE SENSOR FLICKER DETECTION

(71) Applicant: Apple Inc., Cupertino, CA (US)

(72) Inventors: Michael R. Malone, Cupertino, CA (US); Chiajen Lee, Cupertino, CA (US); Christopher G. Zeleznik, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/501,429

(22) Filed: Sep. 30, 2014

(65) Prior Publication Data

US 2015/0163392 A1    Jun. 11, 2015

Related U.S. Application Data

(60) Provisional application No. 61/913,851, filed on Dec. 9, 2013.

(51) Int. Cl.
| | |
|---|---|
| H04N 9/73 | (2006.01) |
| H04N 5/217 | (2011.01) |
| H04N 5/235 | (2006.01) |
| H04N 5/359 | (2011.01) |
| H04N 5/378 | (2011.01) |
| H04N 5/369 | (2011.01) |

(52) U.S. Cl.
CPC ............ *H04N 5/2357* (2013.01); *H04N 5/359* (2013.01); *H04N 5/3696* (2013.01); *H04N 5/378* (2013.01)

(58) Field of Classification Search
CPC .. H04N 5/2357; H04N 5/235; H04N 5/2351; H04N 5/243; H04N 9/735; H04N 5/3696

USPC ............ 348/226.1, 227.1, 228.1, 230.1, 241
See application file for complete search history.

(56) References Cited

U.S. PATENT DOCUMENTS

| | | |
|---|---|---|
| 4,686,648 A | 8/1987 | Fossum |
| 5,105,264 A | 4/1992 | Erhardt et al. |
| 5,329,313 A | 7/1994 | Keith |
| 5,396,893 A | 3/1995 | Oberg et al. |
| 5,471,515 A | 11/1995 | Fossum et al. |
| 5,541,402 A | 7/1996 | Ackland et al. |
| 5,550,677 A | 8/1996 | Schofield et al. |
| 5,781,312 A | 7/1998 | Noda |
| 5,841,126 A | 11/1998 | Fossum et al. |

(Continued)

FOREIGN PATENT DOCUMENTS

| | | |
|---|---|---|
| CN | 1842138 | 10/2006 |
| CN | 101189885 | 5/2008 |

(Continued)

OTHER PUBLICATIONS

U.S. Appl. No. 13/782,532, filed Mar. 1, 2013, Sharma et al.

(Continued)

*Primary Examiner* — Sinh Tran
*Assistant Examiner* — Xi Wang
(74) *Attorney, Agent, or Firm* — Brownstein Hyatt Farber Schreck, LLP

(57) ABSTRACT

An image sensor includes an imaging area and one or more flicker detection regions. The imaging area includes pixels that capture one or more images. Each flicker detection region includes pixels that are sampled multiple times while an image is being captured. The samples can be analyzed to detect flicker in the scene being imaged.

16 Claims, 7 Drawing Sheets

(56) References Cited

U.S. PATENT DOCUMENTS

| | | |
|---|---|---|
| 5,880,459 A | 3/1999 | Pryor et al. |
| 5,949,483 A | 9/1999 | Fossum et al. |
| 6,008,486 A | 12/1999 | Stam et al. |
| 6,040,568 A | 3/2000 | Caulfield et al. |
| 6,233,013 B1 | 5/2001 | Hosier et al. |
| 6,348,929 B1 | 2/2002 | Acharya et al. |
| 6,448,550 B1 | 9/2002 | Nishimura |
| 6,541,751 B1 | 4/2003 | Bidermann |
| 6,713,796 B1 | 3/2004 | Fox |
| 6,714,239 B2 | 3/2004 | Guidash |
| 6,798,453 B1 | 9/2004 | Kaifu |
| 6,816,676 B2 | 11/2004 | Bianchi et al. |
| 6,905,470 B2 | 6/2005 | Lee et al. |
| 6,931,269 B2 | 8/2005 | Terry |
| 6,982,759 B2 | 1/2006 | Goto |
| 7,091,466 B2 | 8/2006 | Bock |
| 7,133,073 B1 | 11/2006 | Neter |
| 7,259,413 B2 | 8/2007 | Rhodes |
| 7,262,401 B2 | 8/2007 | Hopper et al. |
| 7,271,835 B2 | 9/2007 | Iizuka |
| 7,282,028 B2 | 10/2007 | Kim et al. |
| 7,332,786 B2 | 2/2008 | Altice |
| 7,390,687 B2 | 6/2008 | Boettiger |
| 7,437,013 B2 | 10/2008 | Anderson |
| 7,443,421 B2 | 10/2008 | Stavely et al. |
| 7,446,812 B2 | 11/2008 | Ando et al. |
| 7,502,054 B2* | 3/2009 | Kalapathy .............. H04N 5/235 348/226.1 |
| 7,525,168 B2 | 4/2009 | Hsieh |
| 7,554,067 B2 | 6/2009 | Zarnoski et al. |
| 7,555,158 B2 | 6/2009 | Park et al. |
| 7,626,626 B2 | 12/2009 | Panicacci |
| 7,671,435 B2 | 3/2010 | Ahn |
| 7,728,351 B2 | 6/2010 | Shim |
| 7,733,402 B2 | 6/2010 | Egawa et al. |
| 7,742,090 B2 | 6/2010 | Street |
| 7,773,138 B2 | 8/2010 | Lahav et al. |
| 7,786,543 B2 | 8/2010 | Hsieh |
| 7,796,171 B2 | 9/2010 | Gardner |
| 7,873,236 B2 | 1/2011 | Li et al. |
| 7,880,785 B2 | 2/2011 | Gallagher |
| 7,884,402 B2 | 2/2011 | Ki |
| 7,906,826 B2 | 3/2011 | Martin et al. |
| 7,952,121 B2 | 5/2011 | Arimoto |
| 7,952,635 B2 | 5/2011 | Lauxtermann |
| 7,982,789 B2 | 7/2011 | Watanabe et al. |
| 8,026,966 B2 | 9/2011 | Altice |
| 8,032,206 B1 | 10/2011 | Farazi et al. |
| 8,094,232 B2 | 1/2012 | Kusaka |
| 8,116,540 B2 | 2/2012 | Dean et al. |
| 8,140,143 B2 | 3/2012 | Picard et al. |
| 8,153,947 B2 | 4/2012 | Barbier et al. |
| 8,159,588 B2 | 4/2012 | Boemler |
| 8,164,669 B2 | 4/2012 | Compton et al. |
| 8,174,595 B2 | 5/2012 | Honda et al. |
| 8,184,188 B2 | 5/2012 | Yaghmai |
| 8,194,148 B2 | 6/2012 | Doida |
| 8,194,165 B2 | 6/2012 | Border et al. |
| 8,222,586 B2 | 7/2012 | Lee |
| 8,227,844 B2 | 7/2012 | Adkisson |
| 8,233,071 B2 | 7/2012 | Takeda |
| 8,259,228 B2 | 9/2012 | Wei et al. |
| 8,310,577 B1 | 11/2012 | Neter |
| 8,324,553 B2 | 12/2012 | Lee |
| 8,340,407 B2 | 12/2012 | Kalman |
| 8,350,940 B2 | 1/2013 | Smith et al. |
| 8,400,546 B2 | 3/2013 | Itano et al. |
| 8,456,559 B2 | 6/2013 | Yamashita |
| 8,508,637 B2 | 8/2013 | Han et al. |
| 8,514,308 B2 | 8/2013 | Itonaga et al. |
| 8,520,913 B2 | 8/2013 | Dean et al. |
| 8,547,388 B2 | 10/2013 | Cheng |
| 8,575,531 B2 | 11/2013 | Hynecek et al. |
| 8,581,992 B2 | 11/2013 | Hamada |
| 8,594,170 B2 | 11/2013 | Mombers et al. |
| 8,619,163 B2 | 12/2013 | Ogura |
| 8,629,484 B2 | 1/2014 | Ohri et al. |
| 8,634,002 B2 | 1/2014 | Kita |
| 8,648,947 B2 | 2/2014 | Sato et al. |
| 8,723,975 B2 | 5/2014 | Solhusvik |
| 8,754,983 B2 | 6/2014 | Sutton |
| 8,755,854 B2 | 6/2014 | Addison et al. |
| 8,759,736 B2 | 6/2014 | Yoo |
| 8,767,104 B2 | 7/2014 | Makino et al. |
| 8,803,990 B2 | 8/2014 | Smith |
| 8,817,154 B2 | 8/2014 | Manabe et al. |
| 8,902,330 B2 | 12/2014 | Theuwissen |
| 8,908,073 B2 | 12/2014 | Minagawa et al. |
| 8,936,552 B2 | 1/2015 | Kateraas et al. |
| 8,946,610 B2 | 2/2015 | Iwabuchi et al. |
| 8,982,237 B2 | 3/2015 | Chen |
| 9,041,837 B2 | 5/2015 | Li |
| 9,054,009 B2 | 6/2015 | Oike et al. |
| 9,066,017 B2 | 6/2015 | Geiss |
| 9,066,660 B2 | 6/2015 | Watson et al. |
| 9,088,727 B2 | 7/2015 | Trumbo |
| 9,094,623 B2 | 7/2015 | Kawaguchi |
| 9,099,604 B2 | 8/2015 | Roy |
| 9,100,597 B2 | 8/2015 | Hu |
| 9,131,171 B2 | 9/2015 | Aoki et al. |
| 9,232,150 B2 | 1/2016 | Kleekajai et al. |
| 9,270,906 B2 | 2/2016 | Peng et al. |
| 9,277,144 B2 | 3/2016 | Kleekajai et al. |
| 9,344,649 B2 | 5/2016 | Bock |
| 2003/0036685 A1 | 2/2003 | Goodman et al. |
| 2004/0207836 A1 | 10/2004 | Chhibber et al. |
| 2005/0026332 A1 | 2/2005 | Fratti et al. |
| 2006/0256208 A1* | 11/2006 | Ono ..................... H04N 5/2357 348/227.1 |
| 2006/0274161 A1 | 12/2006 | Ing et al. |
| 2007/0263099 A1 | 11/2007 | Motta et al. |
| 2008/0177162 A1 | 7/2008 | Bae et al. |
| 2008/0315198 A1 | 12/2008 | Jung |
| 2009/0096901 A1 | 4/2009 | Bae et al. |
| 2009/0101914 A1 | 4/2009 | Hirotsu et al. |
| 2009/0135276 A1* | 5/2009 | Urisaka ................ H04N 5/2357 348/241 |
| 2009/0146234 A1 | 6/2009 | Luo et al. |
| 2009/0201400 A1 | 8/2009 | Zhang et al. |
| 2010/0013964 A1* | 1/2010 | Negishi ................. H04N 5/367 348/246 |
| 2010/0134631 A1 | 6/2010 | Voth |
| 2011/0028802 A1 | 2/2011 | Addison et al. |
| 2011/0077531 A1 | 3/2011 | Watson et al. |
| 2011/0080500 A1 | 4/2011 | Wang et al. |
| 2011/0156197 A1 | 6/2011 | Tivarus et al. |
| 2011/0245690 A1 | 10/2011 | Watson et al. |
| 2012/0092541 A1 | 4/2012 | Tuulos et al. |
| 2012/0098964 A1 | 4/2012 | Oggier et al. |
| 2012/0147207 A1 | 6/2012 | Itonaga |
| 2013/0147981 A1 | 6/2013 | Wu |
| 2013/0155271 A1 | 6/2013 | Ishii |
| 2013/0222584 A1 | 8/2013 | Aoki et al. |
| 2014/0049683 A1 | 2/2014 | Guenter et al. |
| 2014/0071321 A1 | 3/2014 | Seyama |
| 2014/0232902 A1* | 8/2014 | Kim ..................... H04N 1/4092 348/226.1 |
| 2014/0240550 A1 | 8/2014 | Taniguchi |
| 2014/0246568 A1 | 9/2014 | Wan |
| 2014/0247378 A1 | 9/2014 | Sharma et al. |
| 2014/0252201 A1 | 9/2014 | Li et al. |
| 2014/0253754 A1* | 9/2014 | Papiashvili .......... H04N 5/2357 348/226.1 |
| 2014/0263951 A1 | 9/2014 | Fan et al. |
| 2014/0267855 A1 | 9/2014 | Fan |
| 2014/0347533 A1 | 11/2014 | Toyoda |
| 2014/0354861 A1 | 12/2014 | Pang |
| 2015/0163422 A1 | 6/2015 | Fan et al. |
| 2015/0237314 A1 | 8/2015 | Hasegawa |
| 2015/0264241 A1 | 9/2015 | Kleekajai et al. |
| 2015/0312479 A1 | 10/2015 | McMahon et al. |
| 2015/0350575 A1 | 12/2015 | Agranov et al. |
| 2016/0050379 A1 | 2/2016 | Jiang et al. |

(56) References Cited

U.S. PATENT DOCUMENTS

FOREIGN PATENT DOCUMENTS

| | | |
|---|---|---|
| CN | 101233763 | 7/2008 |
| CN | 101472059 | 7/2009 |
| CN | 101567977 | 10/2009 |
| CN | 101622859 | 1/2010 |
| CN | 101803925 | 8/2010 |
| CN | 102036020 | 4/2011 |
| CN | 102821255 | 12/2012 |
| CN | 103329513 | 9/2013 |
| CN | 103546702 | 1/2014 |
| EP | 2023611 | 2/2009 |
| EP | 2107610 | 10/2009 |
| EP | 2230690 | 9/2010 |
| JP | 2000059697 | 2/2000 |
| JP | 2001211455 | 8/2001 |
| JP | 2009021809 | 1/2009 |
| JP | 2009159186 | 7/2009 |
| JP | 201149697 | 3/2011 |
| JP | 2011097646 | 12/2011 |
| JP | 2012019516 | 1/2012 |
| JP | 2012513160 | 6/2012 |
| JP | 2013070240 | 4/2013 |
| JP | 2013529035 | 7/2013 |
| KR | 20030034424 | 5/2003 |
| KR | 20030061157 | 7/2003 |
| KR | 2008/0069851 | 7/2008 |
| KR | 20100008239 | 1/2010 |
| KR | 20100065084 | 6/2010 |
| KR | 20130074459 | 7/2013 |
| TW | 201301881 | 1/2013 |
| WO | WO 2010/120945 | 10/2010 |
| WO | WO 2012/053363 | 4/2012 |
| WO | WO 2012/088338 | 6/2012 |
| WO | WO 2012/122572 | 9/2012 |
| WO | WO 2013/008425 | 1/2013 |
| WO | WO 2013/179018 | 12/2013 |
| WO | WO 2013/179020 | 12/2013 |

OTHER PUBLICATIONS

U.S. Appl. No. 13/783,536, filed Mar. 4, 2013, Wan.
U.S. Appl. No. 13/785,070, filed Mar. 5, 2013, Li.
U.S. Appl. No. 13/787,094, filed Mar. 6, 2013, Li et al.
U.S. Appl. No. 13/797,851, filed Mar. 12, 2013, Li.
U.S. Appl. No. 13/830,748, filed Mar. 14, 2013, Fan.
U.S. Appl. No. 14/098,504, filed Dec. 5, 2013, Fan et al.
U.S. Appl. No. 14/207,150, filed Mar. 12, 2014, Kleekajai et al.
U.S. Appl. No. 14/207,176, filed Mar. 12, 2014, Kleekajai et al.
U.S. Appl. No. 14/276,728, filed May 13, 2014, McMahon et al.
U.S. Appl. No. 14/292,599, filed May 30, 2014, Agranov et al.
U.S. Appl. No. 14/462,032, filed Aug. 18, 2014, Jiang et al.
U.S. Appl. No. 14/481,806, filed Sep. 9, 2014, Kleekajai et al.
U.S. Appl. No. 14/481,820, filed Sep. 9, 2014, Lin et al.
U.S. Appl. No. 14/503,322, filed Sep. 30, 2014, Molgaard.
U.S. Appl. No. 14/569,346, filed Dec. 12, 2014, Kestelli et al.
U.S. Appl. No. 14/611,917, filed Feb. 2, 2015, Lee et al.
Evaluation Report dated Mar. 4, 2015, Chinese Application No. ZL2014207337276, 13 pages.
Aoki, et al., "Rolling-Shutter Distortion-Free 3D Stacked Image Sensor with -160dB Parasitic Light Sensitivity In-Pixel Storage Node," ISSCC 2013, Session 27, Image Sensors, 27.3 27.3 A, Feb. 20, 2013, retrieved on Apr. 11, 2014 from URL:http://ieeexplore.ieee.org/stamp/stamp.jsp?tp=&arnumber=6487824.
Elgendi, "On the Analysis of Fingertip Photoplethysmogram Signals," *Current Cardiology Reviews*, 2012, vol. 8, pp. 14-25.
Feng, et al., "On the Stoney Formula for a Thin Film/Substrate System with Nonuniform Substrate Thickness," *Journal of Applied Mechanics*, Transactions of the ASME, vol. 74, Nov. 2007, pp. 1276-1281.
Fu, et al., "Heart Rate Extraction from Photoplethysmogram Waveform Using Wavelet Multui-resolution Analysis," *Journal of Medical and Biological Engineering*, 2008, vol. 28, No. 4, pp. 229-232.
Han, et al., "Artifacts in wearable photoplethysmographs during daily life motions and their reduction with least mean square based active noise cancellation method," *Computers in Biology and Medicine*, 2012, vol. 42, pp. 387-393.
Lopez-Silva, et al., "Heuristic Algorithm for Photoplethysmographic Heart Rate Tracking During Maximal Exercise Test," *Journal of Medical and Biological Engineering*, 2011, vol. 12, No. 3, pp. 181-188.
Santos, et al., "Accelerometer-assisted PPG Measurement During Physical Exercise Using the LAVIMO Sensor System," *Acta Polytechnica*, 2012, vol. 52, No. 5, pp. 80-85.
Sarkar, et al., "Fingertip Pulse Wave (PPG signal) Analysis and Heart Rate Detection," *International Journal of Emerging Technology and Advanced Engineering*, 2012, vol. 2, No. 9, pp. 404-407.
Schwarzer, et al., On the determination of film stress from substrate bending: Stoney'S formula and its limits, Jan. 2006, 19 pages.
Yan, et al., "Reduction of motion artifact in pulse oximetry by smoothed pseudo Wigner-Ville distribution," *Journal of Neuro Engineering and Rehabilitation*, 2005, vol. 2, No. 3, pp. 1-9.
Yousefi, et al., "Adaptive Cancellation of Motion Artifact in Wearable Biosensors," 34th Annual International Conference of the IEEE EMBS, San Diego, California, Aug./Sep. 2012, pp. 2004-2008.

\* cited by examiner

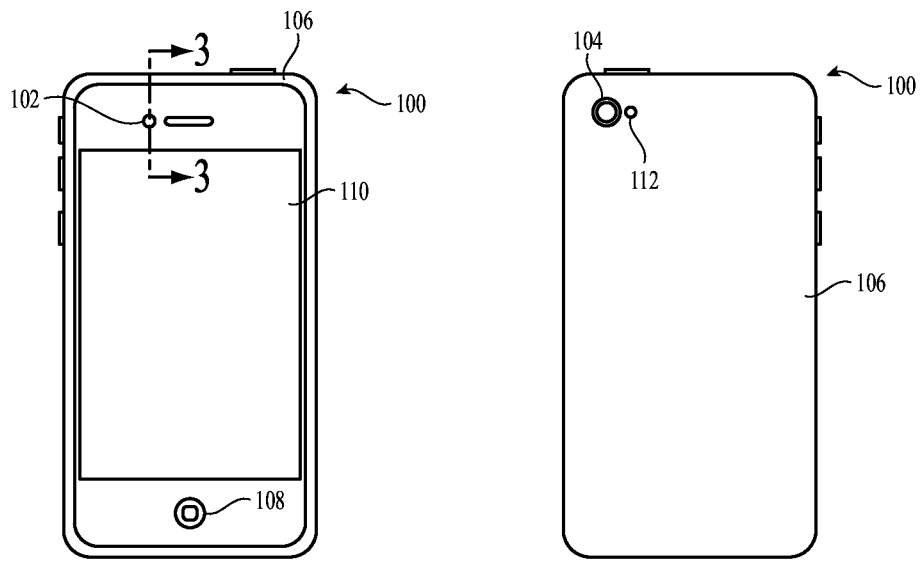
*FIG. 1A*  *FIG. 1B*
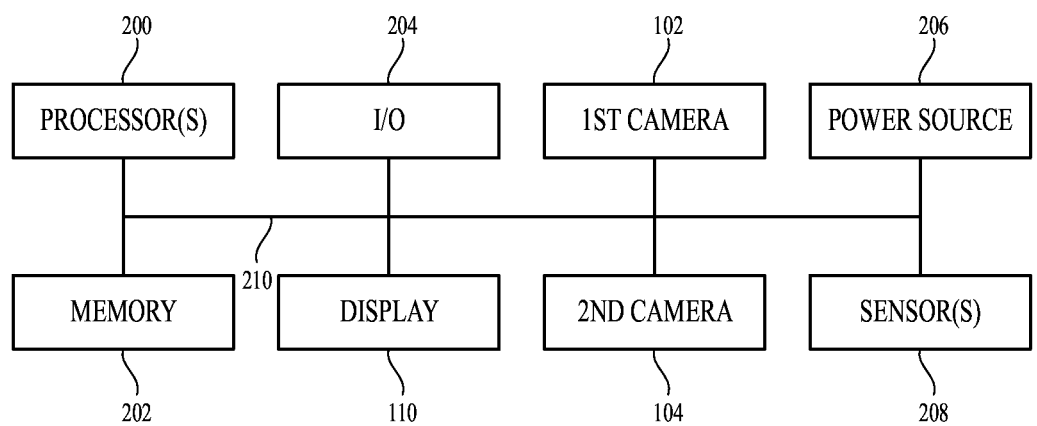
*FIG. 2*

IMAGE SENSOR FLICKER DETECTION

CROSS-REFERENCE TO RELATED APPLICATION

This application claims the benefit under 35 U.S.C. §119 (e) of U.S. Provisional Patent Application No. 61/913,851, filed Dec. 9, 2013, and entitled "Image Sensor Flicker Detection," the entirety of which is incorporated by reference as if fully enclosed herein.

TECHNICAL FIELD

The present invention relates generally to image sensors, and more particularly to detecting flicker in an image sensor.

BACKGROUND

Image sensors can capture an image using a rolling shutter mode or a global shutter mode. In the global shutter mode, the pixels in the image sensor capture the image at a single point in time. Each pixel in the image sensor begins and ends an integration or exposure period at the same time. In the rolling shutter mode, different lines of pixels (e.g., rows) have different exposure times as the signals are read out of the pixels line by line. Each line of pixels will start and end its exposure slightly offset in time from the other lines of pixels in the image sensor. Thus, different lines of the image are captured at slightly different points in time.

Typically, light sources such as incandescent bulbs or fluorescent tubes flicker at the same frequency as their power supply, usually 100 Hz or 120 Hz. This flicker can be captured by some or all of the pixels in an image sensor when an image is captured. The flicker can produce horizontal bands in the captured image depending on the state of the light source at the point in time that each line in the captured image was exposed. A person viewing the captured image may detect the horizontal band or bands in the image.

In some situations, an image sensor can avoid capturing flicker in an image by using exposure times that are multiples of an assumed frequency. For example, to avoid flicker caused by a 60 Hz power supply, the image sensor may choose integration times that are multiples of 1/120 of a second. In this way, each line of the image sees an integer multiple of flicker periods. But if the power supply is a 50 Hz power supply instead of a 60 Hz power supply, a horizontal band caused by a 50 Hz flicker will move predictably in the captured image. An image sensor or imaging system may be able to detect the 50 Hz flicker and responsively adjust the exposure time to avoid the 50 Hz flicker.

An image sensor, however, is not always able to detect flicker in an image when the image sensor uses exposure times that are multiples of an assumed frequency. For example, when an image sensor using a frame rate of 60 frames per second operates with exposure times that are multiples of 50 Hz, flicker produced by a 60 Hz frequency may not be detectable because a horizontal band will not move in the image. Instead, the horizontal band will appear at the same location in the captured images, making it difficult to distinguish the horizontal band from the content in the scene being imaged.

SUMMARY

In one aspect, an image sensor can include an imaging area and one or more flicker detection regions. The imaging area includes one or more pixels. Each flicker detection region includes one or more pixels. The pixel(s) in at least one flicker detection region are sampled multiple times while at least one pixel in the imaging area capture an image.

In another aspect, a processor can be operatively connected to the one or more flicker detection regions. The processor may be adapted to enable the pixel(s) in at least one flicker detection region to be sampled multiple times while at least one pixel in the imaging area capture an image. The processor can receive the samples and analyze the samples to detect flicker in the image being captured. If flicker is detected, the processor can compensate for the flicker. As one example, the processor can adjust an exposure time for capturing the image.

In yet another aspect, a method for capturing an image in an image sensor can include capturing the image with at least one pixel in the imaging area and substantially simultaneously accumulating charge in the pixel(s) in at least one flicker region. Multiple readout operations can be performed to obtain samples from the one or more pixels in the at least one flicker detection region while the at least one pixel in the imaging area captures the image. The samples can be analyzed to detect flicker in the image. If flicker is detected, the processor can compensate for the flicker.

In another aspect, a method for enabling a flicker detection mode in an image sensor can include determining whether flicker is to be detected using at least one flicker detection region when an image is to be captured by at least one pixel in the imaging area, and if flicker is to be detected, reading out charge in the one or more pixels in the at least one flicker detection region multiple times while the image is being captured by the at least one pixel in the imaging area. If flicker will not be detected, the one or more pixels in the at least one flicker detection region and the at least one pixel in the imaging area capture the image.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

FIGS. 1A-1B depict front and rear views of an example electronic device that can include one or more image sensors;

FIG. 2 is an example block diagram of the electronic device shown in FIG. 1;

DETAILED DESCRIPTION

Figure 5:
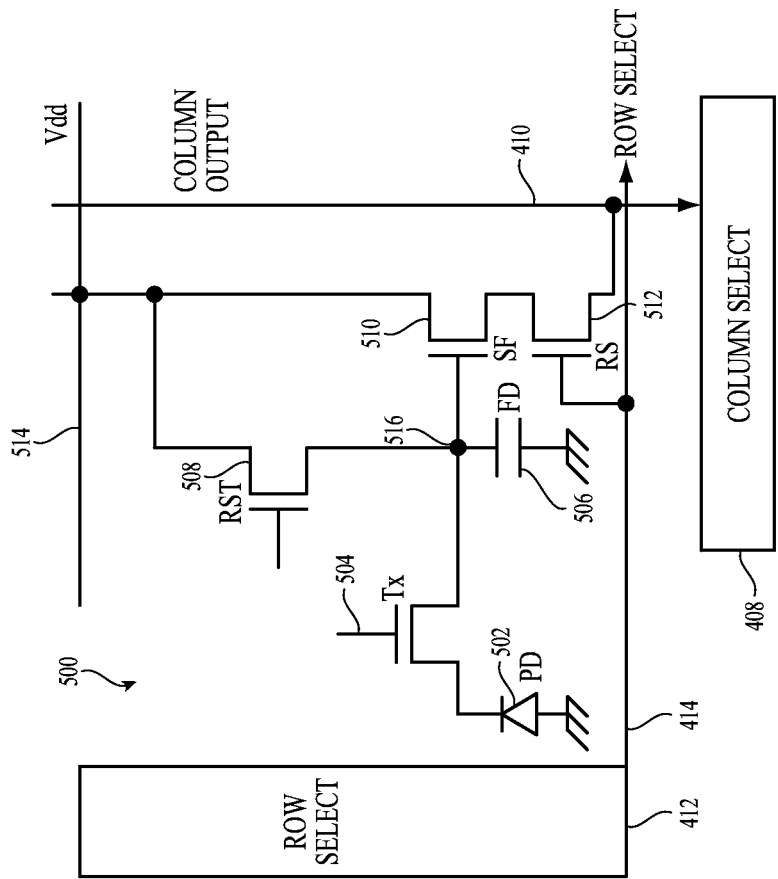
FIG. 5 depicts a simplified schematic view of a pixel that is suitable for use as a pixel 406 shown in FIG. 4.

Embodiments described herein provide an image sensor that includes an imaging area and one or more flicker detection regions. The imaging area includes pixels that capture one or more images. Each flicker detection region includes pixels that are sampled multiple times while an image is being captured. The samples can be analyzed by a processor to detect flicker in the scene being imaged.

Referring now to FIGS. 1A-1B, there are shown front and rear views of an electronic device that includes one or more image sensors. The electronic device 100 includes a first camera 102, a second camera 104, an enclosure 106, an input/output (I/O) member 108, a display 110, and an optional flash 112 or light source for the camera or cameras. The electronic device 100 can also include one or more internal components (not shown) typical of a computing or electronic device, such as, for example, one or more processors, memory components, network interfaces, and so on.

In the illustrated embodiment, the electronic device 100 is implemented as a smart telephone. Other embodiments, however, are not limited to this construction. Other types of computing or electronic devices can include one or more cameras, including, but not limited to, a netbook or laptop computer, a tablet computing device, a wearable communications device, a wearable health assistant, a digital camera, a printer, a scanner, a video recorder, and a copier.

As shown in FIGS. 1A-1B, the enclosure 106 can form an outer surface or partial outer surface and protective case for the internal components of the electronic device 100, and may at least partially surround the display 110. The enclosure 106 can be formed of one or more components operably connected together, such as a front piece and a back piece. Alternatively, the enclosure 106 can be formed of a single piece operably connected to the display 110.

The I/O member 108 can be implemented with any type of input or output member. By way of example only, the I/O member 108 can be a switch, a button, a capacitive sensor, or other input mechanism. The I/O member 108 allows a user to interact with the electronic device 100. For example, the I/O member 108 may be a button or switch to alter the volume, return to a home screen, and the like. The electronic device can include one or more input members or output members, and each member can have a single I/O function or multiple I/O functions.

The display 110 can be operably or communicatively connected to the electronic device 100. The display 110 can be implemented with any type of suitable display, such as a retina display or an active matrix color liquid crystal display. The display 110 provides a visual output for the electronic device 100. In some embodiments, the display 110 can function to receive user inputs to the electronic device. For example, the display 110 can be a multi-touch capacitive sensing touchscreen that can detect one or more user inputs.

The electronic device 100 can also include a number of internal components. FIG. 2 illustrates one example of a simplified block diagram of the electronic device 100. The electronic device can include one or more processors 200, storage or memory components 202, input/output (I/O) interfaces 204, power sources 206, and sensors 208, each of which is discussed in turn below.

The one or more processors 200 can control some or all of the operations of the electronic device 100. The processor(s) 200 can communicate, either directly or indirectly, with substantially all of the components of the electronic device 100. For example, one or more system buses 210 or other communication mechanisms can provide communication between the processor(s) 200, the memory 202, the I/O interfaces 204, the cameras 102, 104, the display 110, the I/O member 108, and/or the sensors 208. The processor(s) 200 can be implemented as any electronic device capable of processing, receiving, or transmitting data or instructions. For example, the one or more processors 200 can be a microprocessor, a central processing unit (CPU), an application-specific integrated circuit (ASIC), a digital signal processor (DSP), or combinations of multiple such devices. As described herein, the term "processor" is meant to encompass a single processor or processing unit, multiple processors, multiple processing units, or other suitably configured computing element or elements.

The one or more storage or memory devices 202 can store electronic data that can be used by the electronic device 100. For example, the memory 202 can store electrical data or content such as, for example, audio files, document files, timing signals, and image data. The memory 202 can be configured as any type of memory. By way of example only, the memory 202 can be implemented as random access memory, read-only memory, Flash memory, removable memory, or other types of storage elements, in any combination.

The one or more I/O interfaces 204 can receive data from a user or one or more other electronic devices. For example, an I/O interface 204 can receive input from the I/O member 108 shown in FIG. 1A. Additionally, an I/O interface 204 can facilitate transmission of data to a user or to other electronic devices. For example, in embodiments where the electronic device 100 is a smart telephone, an I/O interface 204 can receive data from a network or send and transmit electronic signals via a wireless or wired connection. Examples of wireless and wired connections include, but are not limited to, cellular, Wi-Fi, Bluetooth, and Ethernet. In one or more embodiments, an I/O interface 204 supports multiple network or communication mechanisms. For example, an I/O interface 204 can pair with another device over a Bluetooth network to transfer signals to the other device while simultaneously receiving signals from a Wi-Fi or other wired or wireless connection.

The one or more power sources 206 can be implemented with any device capable of providing energy to the electronic device 100. For example, the power source 206 can be a battery or a connection cable that connects the electronic device 100 to another power source such as a wall outlet.

The one or more sensors 208 can by implemented with any type of sensors. Examples sensors include, but are not limited to, audio sensors (e.g., microphones), light sensors (e.g., ambient light sensors), gyroscopes, and accelerometers. The sensors 208 can be used to provide data to the processor 200, which may be used to enhance or vary functions of the electronic device.

It should be noted that FIG. 2 is illustrative only. Other embodiments can include additional or different components.

Figure 3:
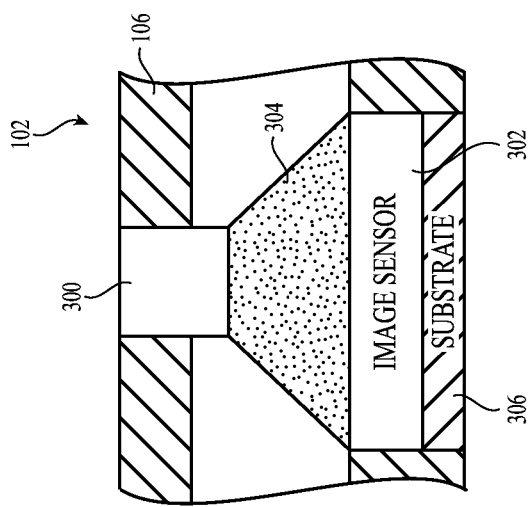
FIG. 3 is a cross-sectional view of the camera 102 shown in FIG. 1A.

As described with reference to FIGS. 1A and 1B, the electronic device 100 includes one or more cameras 102, 104 and optionally a flash 112 or light source for the camera or cameras. FIG. 3 is a simplified cross-section view of the camera 102 taken along line 3-3 in FIG. 1A. Although FIG. 3 illustrates the first camera 102, those skilled in the art will recognize that the second camera 104 can be substantially similar to the first camera 102. In some embodiments, one camera may include a global shutter configured image sensor and one camera can include a rolling shutter configured image sensor. In other examples, one camera can include an image sensor with a higher resolution than the image sensor in the other camera.

The camera 102 includes an imaging stage 300 that is in optical communication with an image sensor 302. The imaging stage 300 is operably connected to the enclosure 106 and positioned in front of the image sensor 302. The imaging stage 300 can include conventional elements such as a lens, a filter, an iris, and a shutter. The imaging stage 300 directs, focuses or transmits light 304 within its field of view onto the image sensor 302. The image sensor 302 captures one or more images of a subject scene by converting the incident light into electrical signals.

The image sensor 302 is supported by a support structure 306. The support structure 306 can be a semiconductor-based material including, but not limited to, silicon, silicon-on-insulator (SOI) technology, silicon-on-sapphire (SOS) technology, doped and undoped semiconductors, epitaxial layers formed on a semiconductor substrate, well regions or buried layers formed in a semiconductor substrate, and other semiconductor structures.

Various elements of imaging stage 300 or image sensor 302 can be controlled by timing signals or other signals supplied from a processor or memory, such as processor 200 in FIG. 2. Some or all of the elements in the imaging stage 300 can be integrated into a single component. Additionally, some or all of the elements in the imaging stage 300 can be integrated with the image sensor 302, and possibly one or more additional elements of the electronic device 100, to form a camera module. For example, a processor or a memory may be integrated with the image sensor 302 in some embodiments.

Figure 4:
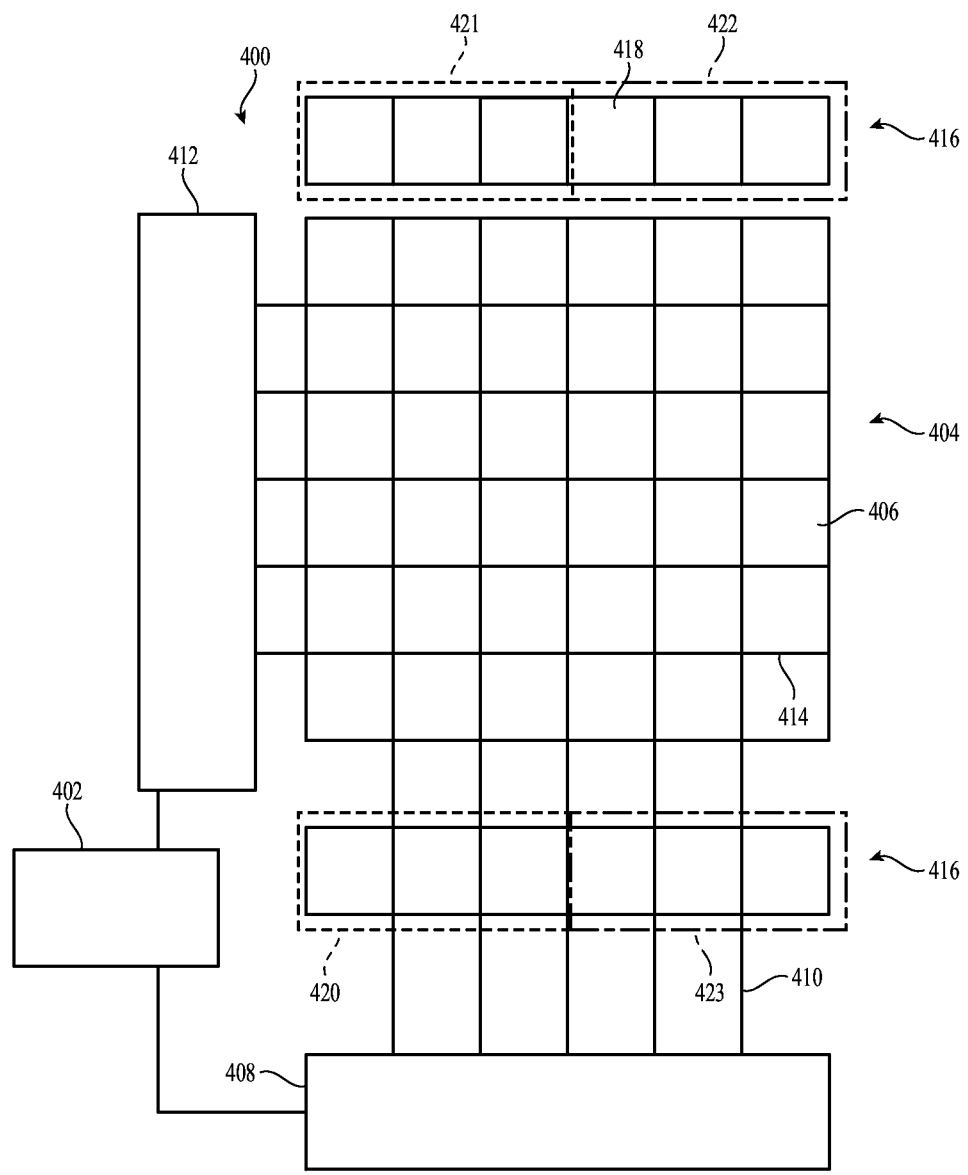
FIG. 4 illustrates a simplified block diagram of one example of an image sensor suitable for use as image sensor 302 shown in FIG. 3.

Referring now to FIG. 4, there is shown a simplified block diagram of one example of an image sensor suitable for use as image sensor 302 shown in FIG. 3. The image sensor 400 can include an image processor 402 and an imaging area 404. The imaging area 404 can be implemented as a pixel array that includes pixels 406. In the illustrated embodiment, the pixel array is configured in a row and column arrangement. However, other embodiments are not limited to this configuration. The pixels in a pixel array can be arranged in any suitable configuration, such as, for example, a hexagon configuration.

The imaging area 404 may be in communication with a column select 408 through one or more column select lines 410 and a row select 412 through one or more row select lines 414. The row select 412 selectively selects a particular pixel 406 or group of pixels, such as all of the pixels 406 in a certain row. The column select 408 selectively receives the data output from the select pixels 406 or groups of pixels (e.g., all of the pixels with a particular column).

The row select 412 and/or the column select 408 may be in communication with the image processor 402. The image processor 402 can process data from the pixels 406 and provide that data to the processor 200 and/or other components of the electronic device 100. It should be noted that in some embodiments, the image processor 402 can be incorporated into the processor 200 or separate therefrom.

One or more flicker detection regions 416 may be positioned adjacent to the imaging area 404. In the illustrated embodiment, one flicker detection region is positioned adjacent to the top of the imaging area 504 and another flicker detection region is located adjacent to the bottom of the imaging area 504. Other embodiments can position the one or more flicker detection regions at different locations. Additionally, each flicker detection region 416 is shown as a single horizontal line of pixels. Other embodiments can include any given number of pixels arranged in any configuration.

Each flicker detection region includes pixels 418. In some embodiments, the pixels 418 are configured as the pixels 406 in the imaging area 404. Other embodiments can configure the pixels 418 differently. Two illustrative pixel configurations are described in more detail later in conjunction with FIGS. 6 and 7. The flicker detection region(s) can reduce the effect of scene content on flicker detection because the flicker detection region(s) sample roughly the same special region of an image.

The pixels 418 in a flicker detection region may be optionally divided into sub-regions. As one example, the pixels 418 can be divided horizontally into two or four sub-regions 420, 421, 422, 423. Dividing the pixels into sub-regions 420, 421, 422, 423 allows the top flicker detection region to be separate from the bottom flicker detection region regardless of the orientation of the image sensor (e.g., portrait or landscape). For example, if the top of the scene being imaged is flickering differently from the bottom of the scene, the top of the scene can be observed using two sub-regions, such as sub-regions 421 and 422, or 422 and 423, or 420 and 423, or 420 and 421 depending on the orientation of the image sensor.

In some embodiments, the one or more flicker detection regions 416 include pixels 418 that are physically separate and distinct from the pixels 406 in the imaging area 404. In other embodiments, the flicker detection region(s) include pixels that are implemented within the imaging area 404 but are logically separated from the pixels in the imaging area. For example, the pixels in the top row and in the bottom row of an imaging area can be used to for flicker detection instead of image capture. And in yet another embodiment, the pixels in the one or more flicker detection region can have multiple modes, with one mode being flicker detection and another mode image capture. Mode enablement is described in more detail in conjunction with FIG. 9.

Referring now to FIG. 5, there is shown a simplified schematic view of a pixel that is suitable for use as a pixel 406 shown in FIG. 4. The pixel 500 includes a photodetector (PD) 502, a transfer transistor (TX) 504, a sense region 506, a reset (RST) transistor 508, a readout transistor 510, and a row select (RS) transistor 512. The sense region 506 is represented as a capacitor in the illustrated embodiment because the sense region 506 can temporarily store charge received from the photodetector 502. As described below, after charge is transferred from the photodetector 502, the charge can be stored in the sense region 506 until the gate of the row select transistor 512 is pulsed.

One terminal of the transfer transistor 504 is connected to the photodetector 502 while the other terminal is connected to the sense region 506. One terminal of the reset transistor 508 and one terminal of the readout transistor 510 are connected to a supply voltage (Vdd) 514. The other terminal of the reset transistor 508 is connected to the sense region 506, while the other terminal of the readout transistor 510 is connected to a terminal of the row select transistor 512. The other terminal of the row select transistor 512 is connected to a column select line 410.

By way of example only, in one embodiment the photodetector 502 is implemented as a photodiode (PD) or pinned photodiode, the sense region 506 as a floating diffusion (FD), and the readout transistor 510 as a source follower transistor (SF). The photodetector 502 can be an electron-based photodiode or a hole based photodiode. It should be noted that the term photodetector as used herein is meant to encompass substantially any type of photon or light detecting component, such as a photodiode, pinned photodiode, photogate, or other photon sensitive region. Additionally, the term sense region as used herein is meant to encompass substantially any type of charge storing or charge converting region.

Those skilled in the art will recognize that the pixel 500 can be implemented with additional or different components in other embodiments. For example, a row select transistor can be omitted and a pulsed power supply mode used to select the pixel, the sense region can be shared by multiple photodetectors and transfer transistors, or the reset and readout transistors can be shared by multiple photodetectors, transfer gates, and sense regions.

When an image is to be captured, an integration period for the pixel begins and the photodetector 502 accumulates photo-generated charge in response to incident light. When the integration period ends, the accumulated charge in the photodetector 502 is transferred to the sense region 506 by selectively pulsing the gate of the transfer transistor 504. Typically, the reset transistor 508 is used to reset the voltage on the sense region 506 (node 516) to a predetermined level prior to the transfer of charge from the photodetector 502 to the sense region 506. When charge is to be readout of the pixel, the gate of the row select transistor is pulsed through the row select 412 and row select line 414 to select the pixel (or row of pixels) for readout. The readout transistor 510 senses the voltage on the sense region 506 and the row select transistor 512 transmits the voltage to the column select line 410. The column select line 410 is connected to readout circuitry (and optionally an image processor) through the column select 408.

In some embodiments, an image capture device, such as a camera, may not include a shutter over the lens, and so the image sensor may be constantly exposed to light. In these embodiments, the photodetectors may have to be reset or depleted before a desired image is to be captured. Once the charge from the photodetectors has been depleted, the transfer gate and the reset gate are turned off, isolating the photodetectors. The photodetectors can then begin integration and collecting photo-generated charge.

The pixels in the flicker detection region(s) can be implemented similarly to pixel 500. Other embodiments can configure the pixels in the flicker detection region or regions differently. Two different implementations are described in more detail in conjunction with FIGS. 6 and 7.

The pixels in a flicker detection region can be operatively connected to respective column select lines, such as column select lines 410 shown in FIG. 4. As such, charge in the pixels can be sampled or read out in the same manner as the pixels in the imaging area.

Figure 6:
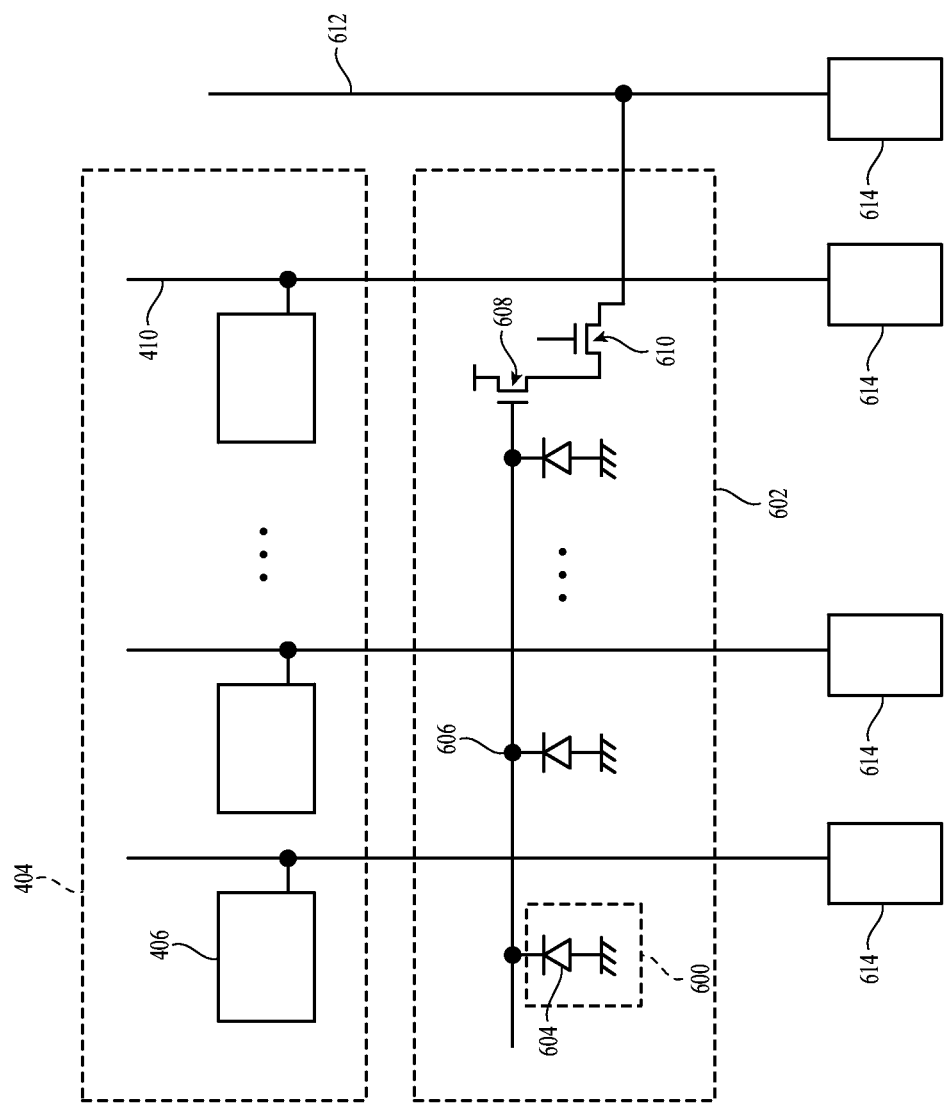
FIG. 6 illustrates a simplified schematic diagram of one example of pixels in an imaging area and in a flicker detection region operatively connected to readout circuitry.

Alternatively, the pixels in the flicker detection region can be operatively connected to separate readout circuitry and column lines. FIG. 6 illustrates a simplified schematic diagram of one example of pixels in an imaging area and in a flicker detection region operatively connected to readout circuitry. As described earlier, the pixels 406 in the imaging area 404 are operatively connected to respective column select lines 410. The pixels 600 in the flicker detection region 602 each include a photodetector 604. The photodetectors 604 are operatively connected to a common flicker sense node 606. The charge from each of the photodetectors 604 can be combined or averaged on the common flicker sense node 606.

The common flicker sense node 606 connects to the gate of a readout transistor 608. In some embodiments, the readout transistor 608 is a source follower transistor. One terminal of the readout transistor 608 is connected to a terminal of a column select transistor 610. The other terminal of the column select transistor 610 is connected to a column line 612. The gate of the column select transistor 610 can be connected to a row select line (not shown). The row select line can be used to select or turn on the column select transistor 610 when the charge or signal is to be sampled from the flicker detection region 602. The other terminal of the readout transistor 608 can be connected to a supply voltage. The column select lines 410 and the column line 612 can each be connected to readout circuitry 614. In some embodiments, the readout circuitry can be shared between two or more column select lines 410 and/or column lines 612. Each readout circuitry 614 can include a digital-to-analog converter to convert the analog signals obtained from the pixels 406 and the flicker detection region 602 to digital signals.

Figure 7:
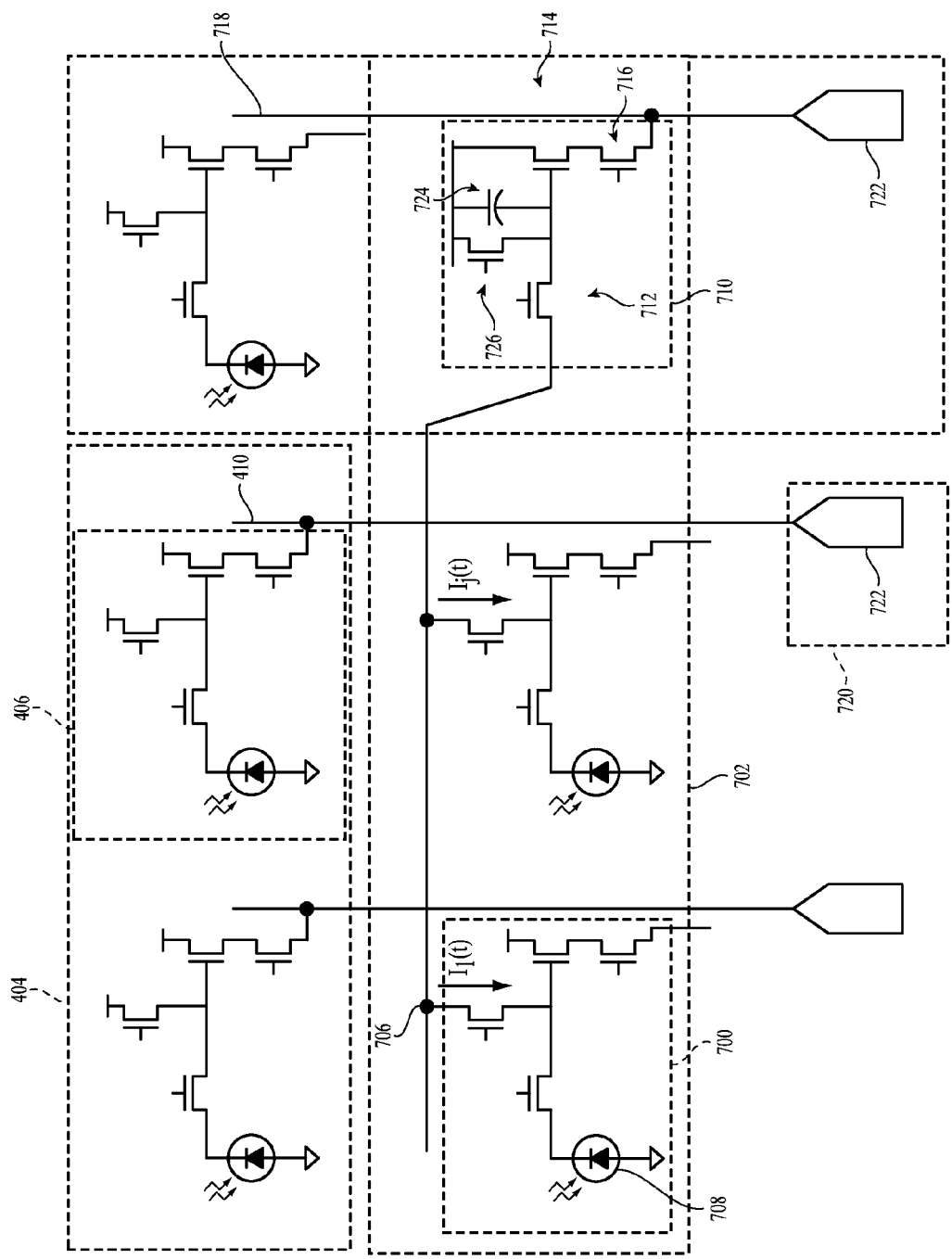
FIG. 7 depicts a simplified schematic diagram of another example of pixels in an imaging area and a flicker detection region operatively connected to readout circuitry.

Referring now to FIG. 7, there is shown a simplified schematic view of another example of pixels in an imaging area and in a flicker detection region operatively connected to readout circuitry. Like the embodiment shown in FIG. 6, the pixels 406 in the imaging area 404 are operatively connected to respective column select lines 410. The pixels 700 in the flicker detection region 702 are operatively connected to a photo-current summing node 706. The photo-current summing node 706 connects the photodetectors 708 together, allowing the photo-current from each photodetector 708 to be summed together. In the illustrated embodiment, current summing can be defined by the equation $I_{SUM} = \sum_{f=1}^{m} I_f(t)$.

The photo-current summing node 706 is connected to a flicker readout circuitry 710. In some embodiments, the flicker readout circuitry can include at least one column and ADC dedicated to the flicker detection region (e.g., column line 718 and ADC 722), in addition to the circuitry for the imaging area 404. The flicker readout circuitry 710 can include circuitry that is similar in structure as some or all of the circuitry in the pixels 406. For example, the flicker readout circuitry 710 can include a transfer transistor 712. One terminal of the transfer transistor 712 is connected to the photo-current summing node 706, while the other terminal is connected to the gate of a readout transistor 714. In some embodiments, the readout transistor 714 is a source follower transistor. One terminal of the readout transistor 714 is connected to a terminal of a column select transistor 716. The other terminal of the column select transistor 716 is connected to a column line 718. The column line 718 is dedicated to flicker readout circuitry. Any pixels in the flicker detection column other than the flicker readout circuitry 710 are disconnected from the column line 718 and can be connected to a separate column line (not shown).

The gate of the column select transistor 716 can be connected to a row select line (not shown). The row select line can be used to select or turn on the column select transistor 716 when the charge or signal is to be sampled from the flicker detection region 702. The other terminal of the readout transistor 714 can be connected to a supply voltage. The column select lines 410 and the column line 718 can each be connected to readout circuitry 720, which includes an analog-to-digital converter 722.

A capacitor 724 can be connected to the photocurrent summing node 706 through switch 726. The size of the capacitor 724 can be programmable to adjust for various lighting conditions and/or integration times of the summed photocurrent detected by the pixels 700 in the flicker detection region(s). For example, a smaller capacitor value can be selected for low illumination conditions and/or a short integration time, such that the flicker readout circuitry 710 can be operated in parallel with the normal operation of pixels 406. Additionally, in some embodiments, the capacitor 724 can reduce the threshold voltage or current needed to turn on the readout transistor 714.

Figure 8:
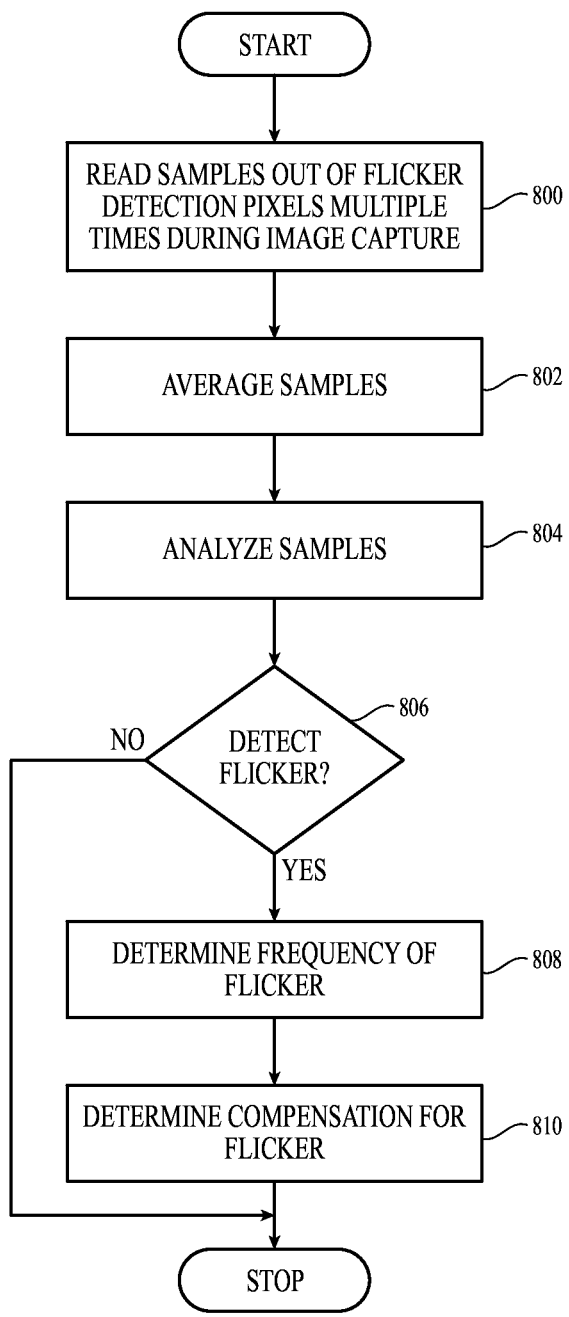
FIG. 8 is a flowchart of a method for detecting flicker in an image sensor.

FIG. 8 is a flowchart of a method for detecting flicker in an image sensor. In one embodiment, an image may be captured using at least one pixel in the imaging area while substantially simultaneously accumulating charge in the pixel(s) in at least one flicker region. The method begins at block 800, where charge accumulates in one or more pixels in a flicker detection region or regions, and samples are read out of the pixels multiple times while an image is captured by the pixels in the imaging area. For example, samples can be read out of the pixels 100 to 1000 times during image capture. The samples can be averaged together at block 802. In some embodiments, the samples are averaged digitally by a processor, such as by image processor 402. In such embodiments, the pixels in the flicker detection region(s) can be reset and read out in between reading out the pixels in the imaging area at the desired sample frequency.

Other embodiments can average the samples differently. For example, the samples can be averaged as described in conjunction with FIG. 6 and FIG. 7. And in other embodiments, the pixels in the flicker detection region(s) can be operatively connected to an analog-to-digital converter that is separate from the image sensor and operates independently of the readout circuitry and/or analog-to-digital converters in the image sensor.

Next, as shown in block 804, the averaged samples are analyzed to determine if flicker is present in the scene being imaged. The averaged samples can be analyzed by a processor, such as image processor 402 (FIG. 4) or processor 200 (FIG. 2). For example, in one embodiment, the processor can perform a Fourier transform using the averaged samples. As another example, the processor can perform a correlation with a known flicker pattern to detect flicker. And in yet another embodiment, the processor can measure the distance between local maxima and minima to detect flicker.

A determination can then be made at block 806 as to whether or not flicker is detected. If not, the method ends. When flicker is detected, the process passes to block 808 where a frequency of the flicker can be determined. Compensation for the flicker is then determined at block 810. In one embodiment, the exposure time of the image capture is adjusted to reduce or eliminate flicker in the captured image.

Figure 9:
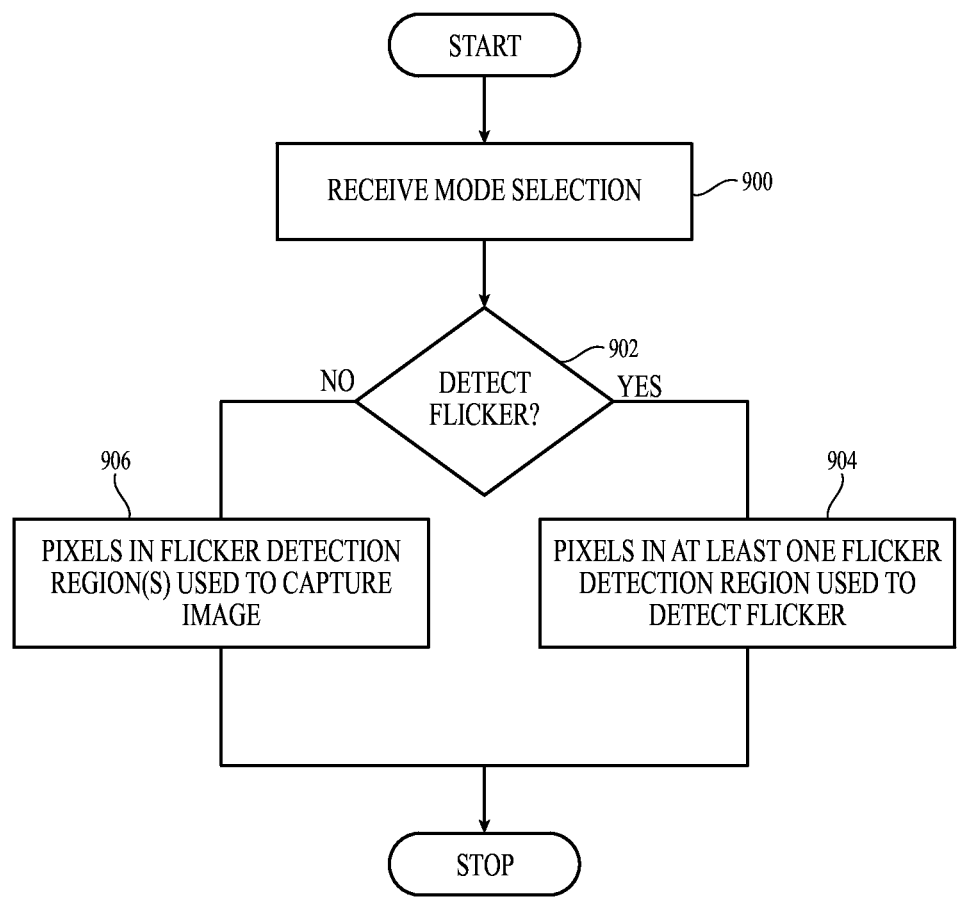
FIG. 9 is a flowchart of a method for enabling a mode in an image sensor.

As described earlier, the pixels in the one or more flicker detection region can have multiple modes, with one mode being flicker detection and another mode image capture. FIG. 9 is a flowchart of a method for enabling a mode in an image sensor. A mode selection signal can be received in block 900. The mode can be selected by a user, by the image sensor, and/or by the electronic device. For example, the image sensor may determine that flicker detection will not be needed, such as when an image is captured outdoors in sunlight. Alternatively, a user can select whether he or she wants to utilize flicker detection when capturing an image.

Next, as shown in block 902, a determination can be made as to whether or not the flicker detection mode is selected. If so, the process passes to block 904 where one or more pixels in at least one flicker detection region are used to detect flicker and the method ends. When the flicker detection mode is not selected, the pixel(s) in the flicker detection region(s) may be used to capture an image along with the pixels in the imaging area (block 906), and the method ends. The signals and/or the timing of the signals provided to the pixels can change based on which mode is selected. By way of example only, the processor 402 can provide or enable the signals to be transmitted to the pixels for each mode. In some embodiments, the processor can produce the signals or read the signals from a memory (e.g., memory 202).

Other embodiments can perform the method shown in FIG. 8 or in FIG. 9 differently. A block can be added or deleted, or the blocks can be performed in a different order. As one example, block 808 in FIG. 8 can be omitted in some embodiments.

Flicker detection regions can detect the presence of flicker as well as the absence of flicker. Compensation for detected flicker can occur more quickly than in convention image sensors because samples are read out of the flicker detection region(s) multiple times per frame (e.g., per image capture). Additionally or alternatively, flicker occurring at a variety of different frequencies can be detected more easily.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

We claim:

1. An image sensor, comprising:
   an imaging area that includes a plurality of pixels;
   one or more flicker detection regions each comprising one or more pixels; and
   a first readout circuitry operatively connected to each flicker detection region, wherein the first readout circuitry comprises:
      a first terminal of a transfer transistor operatively connected to each photodetector in a respective flicker detection region;
      a second terminal of the transfer transistor operatively connected to a gate of a readout transistor;
      a first terminal of a switch transistor operatively connected to the gate of the readout transistor;
      a second terminal of the readout transistor and a second terminal of the switch transistor operatively connected to a voltage source; and
      a variable capacitor operatively connected between the voltage source and the gate of the readout transistor;
   wherein at least one of the one or more pixels in at least one flicker detection region is sampled multiple times while at least one pixel in the imaging area captures an image.

2. The image sensor as in claim 1, further comprising a second readout circuitry operatively connected to one or more pixels in the imaging area.

3. The image sensor as in claim 2, further comprising a processing device operatively connected to the first and the second readout circuitry.

4. The image sensor as in claim 1, wherein the first readout circuitry comprises:
   a first terminal of a select transistor operatively connected to a first terminal of the readout transistor; and
   a second terminal of the select transistor operatively connected to a column line.

5. An imaging system, comprising:
   an imaging area that includes a plurality of pixels; and
   one or more flicker detection regions each comprising one or more pixels;

a first readout circuitry operatively connected to each flicker detection region, wherein the first readout circuitry comprises:
- a first terminal of a transfer transistor operatively connected to each photodetector in a respective flicker detection region;
- a second terminal of the transfer transistor operatively connected to a gate of a readout transistor;
- a first terminal of a switch transistor operatively connected to the gate of the readout transistor;
- a second terminal of the readout transistor and a second terminal of the switch transistor operatively connected to a voltage source; and
- a variable capacitor operatively connected between the voltage source and the gate of the readout transistor; and a processor adapted to:
enable the one or more pixels in at least one flicker detection region to be sampled multiple times while the plurality of pixels in the imaging area capture an image; and detect flicker in the image based on the samples read out of the one or more pixels in the at least one flicker detection region.

6. The imaging system as in claim 5, further comprising a second readout circuitry operatively connected to one or more pixels in the imaging area.

7. The imaging system as in claim 6, wherein the processor is operatively connected to the first readout circuitry.

8. The imaging system as in claim 6, wherein the processor is operatively connected to the second readout circuitry.

9. A method for capturing an image in an image sensor, wherein the image sensor includes an imaging area comprising one or more pixels and one or more flicker detection regions each comprising one or more pixels, the method comprising:

capturing an image with at least one pixel in the imaging area;

substantially simultaneously accumulating charge in the one or more pixels in at least one flicker detection region;

performing multiple readout operations to obtain samples from the one or more pixels in the at least one flicker detection region while the at least one pixel in the imaging area captures the image, wherein each readout operation comprises averaging the samples by combining the samples on a common sense node or a common photo-current summing node operatively connected to the one or more pixels in the at least one flicker detection region; and detecting flicker in the image by analyzing the samples.

10. The method as in claim 9, further comprising compensating for the flicker.

11. The method as in claim 10, wherein compensating for the flicker comprises adjusting an exposure time for capturing the image.

12. The method as in claim 9, further comprising prior to analyzing the samples, averaging the samples obtained in each readout operation.

13. The method as in claim 9, wherein analyzing the samples to detect flicker comprises performing a Fourier transform on the samples.

14. The method as in claim 9, wherein analyzing the samples to detect flicker comprises performing a correlation with the samples and a known flicker pattern to detect flicker.

15. The method as in claim 9, wherein analyzing the samples to detect flicker comprises measuring a distance between maxima and minima in the samples to detect flicker.

16. The method as in claim 9, further comprising determining a frequency of the detected flicker.

* * * * *